(12) United States Patent
Bai et al.

(10) Patent No.: US 7,615,509 B2
(45) Date of Patent: Nov. 10, 2009

(54) HIGH ACTIVITY SUPPORTED DISTILLATE HYDROPROCESSING CATALYSTS

(75) Inventors: Chuansheng Bai, Phillipsburg, NJ (US); EL-Mekki El-Malki, Falls Church, VA (US); Jeff Elks, Easton, PA (US); Zhiguo Hou, Nazareth, PA (US); Jon M. McConnachie, Annandale, NJ (US); Pallassana S. Venkataraman, Nazareth, PA (US); Jason Wu, Clinton, NJ (US); Peter W. Jacobs, Bound Brook, NJ (US); Jun Han, Sunnyvale, CA (US); Daniel M. Giaquinta, Saratoga, CA (US); Alfred Hagemeyer, Rheine (DE); Valery Sokolovskii, Sunnyvale, CA (US); Anthony F. Volpe, Jr., Santa Clara, CA (US); David M. Lowe, Sunnyvale, CA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 11/974,079

(22) Filed: Oct. 11, 2007

(65) Prior Publication Data

US 2008/0146438 A1   Jun. 19, 2008

Related U.S. Application Data

(60) Provisional application No. 60/875,701, filed on Dec. 19, 2006, provisional application No. 60/875,703, filed on Dec. 19, 2006.

(51) Int. Cl.
*B01J 21/18* (2006.01)

(52) U.S. Cl. .................. 502/185; 502/173; 502/174; 502/180; 502/182; 502/216; 502/219; 502/220; 502/221

(58) Field of Classification Search .............. 502/173, 502/174, 180, 182, 185, 216, 219, 220, 221
See application file for complete search history.

(56) References Cited

U.S. PATENT DOCUMENTS

| | | | |
|---|---|---|---|
| 3,615,207 A | 10/1971 | Lee | |
| 4,431,747 A * | 2/1984 | Seiver et al. | 502/220 |
| 5,192,734 A | 3/1993 | Creighton et al. | |
| 6,068,758 A | 5/2000 | Strausz | |
| 6,162,350 A | 12/2000 | Soled et al. | |
| 6,291,391 B1 * | 9/2001 | MacArthur | 502/216 |
| 2004/0226863 A1 * | 11/2004 | Uzio et al. | 208/213 |
| 2005/0250863 A1 * | 11/2005 | Green et al. | 518/703 |
| 2006/0060502 A1 | 3/2006 | Soled et al. | |

* cited by examiner

*Primary Examiner*—Elizabeth D Wood (57) ABSTRACT

Supported metallic catalysts comprised of a Group VIII metal, a Group VIB metal, and an organic additive, and methods for synthesizing supported metallic catalysts are provided. The catalysts are prepared by a method wherein precursors of both metals are mixed and interacted with at least one organic additive, dried, calcined, and sulfided. The catalysts are used for hydroprocessing, particularly hydrodesulfurization and hydrodenitrogenation, of hydrocarbon feedstocks.

23 Claims, 5 Drawing Sheets

HIGH ACTIVITY SUPPORTED DISTILLATE HYDROPROCESSING CATALYSTS

This application claims the benefit of U.S. Provisional Applications 60/875,701 and 60/875,703 filed Dec. 19, 2006.

FIELD OF THE INVENTION

This invention relates to the use of supported Group VIB plus Group VIII catalyst for the hydroprocessing, including hydrodesulfurization (HDS) and hydrodenitrogenation (HDN), of hydrocarbon feeds. The catalyst is supported on a carrier, preferably a large pore volume carrier and prepared using supports impregnated with organic additives. The catalyst provides superior HDS and HDN activity.

BACKGROUND OF THE INVENTION

Increasingly stringent environmental regulations will require significant reductions in the sulfur content of transportation fuels. For example, by the end of this decade, maximum sulfur levels for distillate fuel will be limited to 10 wppm in Europe and Japan and 15 wppm in North America. To meet these ultra-low sulfur requirements without expensive modifications to existing refineries, it will be necessary to design a new generation of catalyst that has very high activity for desulfurization, particularly for distillate fuels at low to medium pressure. The issue of sulfur contamination is further complicated by the need of many refineries to process crudes that are high in both sulfur and nitrogen contaminants as the supply of crudes low in these contaminants is decreasing.

The ease of removal of sulfur contaminants depends in part on their chemical nature. For example, sulfides and disulfides present in lower boiling distillate fractions are generally more easily removed than the thiophenic and other heterocyclic sulfur compounds present in higher boiling fractions. Thiophenic and other heterocyclic sulfur compounds require both ring breaking and saturation and therefore may require more active hydrodesulfurization (HDS) catalysts and/or more severe reaction conditions.

The general approach to both the HDS and hydrodenitrogenation (HDN) of distillate fuels is catalytic hydrotreating to convert sulfur and nitrogen contaminants to hydrogen sulfide and ammonia. Typical commercial hydrotreating catalysts include Group VIB and Group VIII metals. Molybdenum and tungsten are the most commonly used Group VIB metals while cobalt and nickel are the most commonly used Group VIII metals. These catalysts are usually used in their sulfided form, and normally comprise a carrier having deposited thereon the metal components. CoMo catalysts on alumina are recommended for low pressure processes whereas NiMo catalysts on alumina are recommended for high pressure processes.

Various approaches have been tried for providing HDS catalysts with improved activity. In one approach, a family of compounds, related to hydrotalcites, e.g., ammonium nickel molybdates, has been prepared. Whereas X-ray diffraction analysis has shown that hydrotalcites are layered phases composed of positively charged sheets and exchangeable anions located in the galleries between the sheets, the related ammonium nickel molybdate phase has molybdate anions in interlayer galleries bonded to nickel oxyhydroxide sheets. See, for example, Levin, D., Soled, S. L., and Ying, J. Y., Crystal Structure of an Ammonium Nickel Molybdate prepared by Chemical Precipitation, Inorganic Chemistry, Vol. 35, No. 14, p. 4191-4197 (1996). The preparation of such materials also has been reported by Teichner and Astier, Appl. Catal. 72, 321-29 (1991); Ann. Chim. Fr. 12, 337-43 (1987), and C. R. Acad. Sci. 304 (II), #11, 563-6 (1987) and Mazzocchia, Solid State Ionics, 63-65 (1993) 731-35.

Another approach is disclosed in U.S. Pat. Nos. 6,162,350; 6,652,738, 6,635,599 and 6,534,437, all of which are incorporated herein by reference, which relates to a family of bulk Group VII/Group VIB trimetallic catalysts for the removal of sulfur from distillate fuels. The preferred trimetallic catalysts are comprised of Ni—Mo—W and are prepared from a variety of catalyst precursor compounds.

Yet another approach is to combine the hydrotreating catalyst with additives. Examples of this approach are found in U.S. Pat. Nos. 6,923,904 and 6,280,610. U.S. Pat. No. 6,280,610 discloses a processes for reducing the sulfur content of a hydrocarbon feedstock which comprises subjecting a catalyst comprising a Group VIB metal component, a Group VIII metal component, and an organic additive on a carrier to an optional sulfidation step, and contacting a feedstock with the sulfided catalyst. In U.S. Pat. No. 6,923,904, the sulfidation step is not optional. In both patents, the catalyst is formed by impregnating a support with a Group VIB metal component, a Group VIII metal component, and an organic additive. The impregnated support is then heated to a temperature sufficient to maintain at least a portion of the additive on the support by avoiding decomposition or evaporation.

There is still a need in the art for even more active catalysts for producing transportation fuels having ultra-low levels of sulfur, particularly for low to medium pressure hydrotreating.

SUMMARY OF THE INVENTION

In an embodiment, a process for making a supported hydroprocessing catalyst is provided. The process includes preparing a solution, slurry, or other mixture containing at least one Group VIB metal, at least one Group VIII metal, and an organic additive that serves as the solvent for the solution, slurry, or mixture. A support is impregnated with the solution, slurry, or mixture. The impregnated support is dried at a temperature of from 200 to 450 C to produce a partially calcined, impregnated support having a carbon content of at least 5 wt % based on the weight of the partially calcined, impregnated support. The partially calcined, impregnated support is then sulfided.

In another embodiment, a process for making a supported hydroprocessing catalyst is provided. The process includes preparing a solution, slurry, or other mixture containing at least one Group VIB metal and at least one Group VIII metal, and at least one organic complexing agent. A support is impregnated with the solution, slurry, or mixture. The impregnated support is dried at temperatures of from 200 to 450° C. to produce a dried, impregnated support. The dried, impregnated support is subjected to at least one further cycle of impregnation and drying until an impregnated support having a total Group VIB and Group VIII metals content of at least about 20 wt %, calculated as metal oxides is produced. This support is then partially calcined at temperatures of from 200 to 450° C. for a time sufficient to yield a partially calcined impregnated support having a carbon content of at least 5 wt. %, based on the weight of the calcined, impregnated support. Finally, the calcined support is sulfided under sulfiding conditions to produce a supported catalyst.

In still another embodiment, a process for making a supported hydroprocessing catalyst is provided. The process includes preparing a solution, slurry, or other mixture containing at least one transition metal and at least one organic complexing agent. A support containing at least one Group VIB metal, and optionally at least one Group VIII metal, is impregnated with the solution, slurry, or mixture. In embodiments where the support only includes the Group VIB metal, the solution, slurry, or other mixture further contains a Group VIII metal. The impregnated support is dried at temperatures of from 100 to 450° C. to produce a dried, impregnated support. The dried, impregnated support is sulfided under sulfiding conditions to produce a supported catalyst.

In yet another embodiment, the invention provides a catalyst composition prepared according to any of the above three processes.

In still another embodiment, the invention provides a method for hydroprocessing of a hydrocarbon feedstock using a catalyst made according to an embodiment of the invention. In such an embodiment, the feedstock is exposed to the catalyst in the presence of hydrogen.

DETAILED DESCRIPTION OF THE INVENTION

In various embodiments, the catalysts are supported catalysts wherein the supported catalyst particles are comprised of Group VIB metals, preferably Mo or W, most preferably Mo, plus Group VIII metals, preferably Group VIII non-noble metals, more preferably Co or Ni, most preferably Co, provided that the catalysts have a total metals content of at least about 35 wt. %, calculated as metal oxides, and a residual organic carbon content of at least about 5 wt. %, based on supported catalyst; with the balance being a carrier or support, wherein the carrier preferably has a minimum pore volume of 0.35 per volume of carrier, more preferably a minimum pore volume of 0.40. The Group designations are based on the Sargent-Welch Periodic Table, copyright 1968. As noted above, the catalyst contains an organic residue, preferably a carbon residue. The organic residue is a factor leading to increased activity of the catalyst for hydrotreating. In another embodiment, the catalysts are supported catalysts wherein the supported catalyst particles are comprised of Group VIB metals, preferably Mo or W, most preferably Mo, plus Group VIII metals, preferably Group VIII non-noble metals, more preferably Co or Ni, most preferably Co, provided that the catalysts have a total metals content of between about 20-60 wt. %, preferably at least about 20 wt. %, more preferably at least about 30 wt. %, and even more preferably at least about 35 wt. %, calculated as metal oxides, and a residual organic carbon content of between about 1-50 wt. %, preferably between about 5-20 wt. %, based on supported catalyst; with the balance being a carrier or support. The molar ratio of Group VIII non-noble metal to Group VIB metal in the supported catalysts ranges generally from about 10 to 1 to about 1 to 10. Preferably, the ratio of Group VIII non-noble metal to Group VIB metal is less than about 3 to 1, and more preferably less than about 2 to 1. Preferably, the ratio of Group VIII non-noble metal to Group VIB metal is greater than about 1 to 3, and more preferably greater than about 1 to 2. The metals are preferably present as organic complexes (or complexes of organic residues thereof) and/or oxides of the corresponding metals, or if the supported catalyst precursor has been sulfided to form the catalyst composition, sulfidic compounds of the corresponding metals. In an embodiment, the organic complex or organic residue complex can be based on an organic acid, such as a carboxylic acid.

In another embodiment, the catalysts according to the invention are supported trimetallic catalysts wherein the supported catalyst particles are comprised of about 0.1 wt. % to about 50 wt. % of Group VIB, Group VIII metals plus third metal calculated as metal oxides, with the balance being a carrier, based on the total weight of the catalyst particles. The Group designations are based on the Sargent-Welch Periodic Table, copyright 1968. The molar ratio of third metal to Group VIII metal ranges from about 1 to 10 to about 10 to 1. Preferred metals are Mo and W from Group VIB and preferred Group VIII metals are non-noble metals, especially Co and Ni. Third metals are first row transition metals selected from Sc, Ti, V, Cr, Mn, Fe, Co, Ni, Cu, or Zn, preferably Co, Ni, or Zn, especially Zn. When the third metal is Zn, the third metal may be added at any point in the catalyst preparation. When the third metal is Co or Ni, the third metal is added after the Group VIB metal and the Group VIII metal have already been added to the carrier in molar ratios typical of conventional hydroprocessing catalysts as is well known in the art. In addition, when the third metal is Co or Ni, the third metal cannot be added in conjunction with further addition of a Group VIB metal. The additional Co and Ni are referred to as third metals even if the Group VIII metal was Co or Ni, respectively. The molar ratio of Group VIII non-noble metal to Group VIB metal ranges generally from about 10 to 1 to about 1 to 10 and preferably from about 3 to 1 to about 1 to 3.

Suitable carriers (supports) can include catalyst supports, such as refractories, such as silicon carbide, and metal oxides such as alumina, silica, silica-alumina, magnesia, zirconia, boria, yttria, titania and the like. Especially preferred are alumina and silica. Preferred aluminas are porous aluminas such as gamma, theta, delta, kappa, eta or mixtures of crystalline phases such as alpha and theta. The acidity and/or other properties of metal oxide supports can be controlled by adding promoters and/or dopants, or by controlling the nature of the metal oxide support, e.g., by controlling the amount of silica incorporated into a silica-alumina support. Examples of promoters and/or dopants include halogens, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

In an embodiment, the support or carrier can preferably possess large pore volume per volume of support. By large pore volume is meant that the support should have a pore volume of at least 0.35 cc/cc of support, preferably a pore volume of at least 0.40 cc/cc. The selection of supports having large pore volumes relates to maximizing the loading of impregnation solution per individual impregnation step.

It is within the scope of this invention that the catalyst compositions also contain any additional component that is conventionally present in hydroprocessing catalysts such as an acidic component, e.g. phosphorus or boron compounds, additional transition metals, rare earth metals, main group metals such as Si or Al, or mixtures thereof. Suitable additional transition metals are, e.g. rhenium, ruthenium, rhodium, iridium, chromium, vanadium, iron, platinum, palladium, cobalt, nickel molybdenum, zinc, niobium, or tungsten. All these metal compounds are generally present in the sulfided form if the catalyst composition has been sulfided. Prior to sulfidation, at least a portion of one or more of these metals can be complexed by the organic compound-based material in the catalyst precursor. After sulfidation, it is believed that at least a portion of the sulfided metals are still somehow directly or indirectly bound to an organic compound-based material or organic residue in the catalyst.

Feedstocks suitable for processing by the catalysts of this invention include feedstocks for the production of distillate fuels having low sulfur contents. Suitable feedstocks include distillates with boiling points ranging from naphtha to vacuum gas oil, preferably boiling in the range 25 to 475° C., measured by ASTM D 86 or ASTM 2887, derived from mineral or synthetic sources. Preferred feedstocks are those having boiling points from 170 to 350° C. and suitable for producing distillate fuels, especially diesel fuels. Feedstocks may have high contents of nitrogen- and sulfur-contaminants. Feeds containing up to 0.2 wt. % of nitrogen, based on feed and up to 3.0 wt. % of sulfur can be processed in the present process. Sulfur and nitrogen contents may be measured by standard ASTM methods D5453 and D4629, respectively.

Catalyst Precursor Preparation and Conversion to Catalyst

In an embodiment, the catalyst precursors of the invention are prepared by impregnating a support with an impregnating solution and calcining. Once the impregnated supported catalyst precursor has been sulfided, it becomes the catalyst composition. The impregnation solution for impregnating the support includes Group VIB/Group VIII compounds, preferably Group VIB/non-noble metal Group VIII compounds, more preferably cobalt compounds, molybdenum compounds, an organic complexing agent, and optionally other organic additives such as alcohols or polyols, (e.g., ethylene glycol), aldehydes (e.g., glyoxal) or ketones. The metal compounds include soluble salts and insoluble compounds that become soluble under certain conditions. Non-limiting examples of suitable Co precursor compounds include carbonates, nitrates, sulfates, acetates, chlorides, hydroxides, hydroxycarbonates, acetyl acetates, acetyl acetonates, metallic Co(0), Co oxides, Co carboxylates (in particular Co glyoxylate), Co citrate, Co gluconate, Co tartrate, Co glycine, Co lactate, Co naphthenate, Co oxalate, Co formate, Co malate, Co pyruvate, Co glycolate, and mixtures thereof. Preferred molybdenum and tungsten precursor compounds include alkali metal or ammonium molybdate (also peroxo-, di-, tri-, tetra-, hepta-, octa-, or tetradecamolybdate), molybdic acid, phosphomolybdic acid, phosphotungstic acid, Mo—P heteropolyanion compounds, W—Si heteropolyanion compounds, Co—Mo—W heteropolyanion compounds, alkali metal or ammonium tungstates (also meta-, para-, hexa-, or polytungstate), acetyl acetonates, Mo(0) metal, Mo oxides, Mo peroxo complexes, and mixtures thereof. In still other embodiments, any suitable Group VIII or Group VIB metal reagent can be used to prepare Group VIII or Group VIB metal solutions.

Organic acids are a preferred class of organic complexing agent. Non-limiting examples of organic complexing agents suitable for use herein include pyruvic acid, levulinic acid, 2-ketogulonic acid, keto-gluconic acid, thioglycolic acid, 4-acetylbutyric acid, 1,3-acetonedicarboxylic acid, 3-oxo propanoic acid, 4-oxo butanoic acid, 2,3-diformyl succinic acid, 5-oxo pentanoic acid, 4-oxo pentanoic acid, ethyl glyoxylate, glycolic acid, glucose, glycine, oxamic acid, glyoxylic acid 2-oxime, ethylenediaminetetraacetic acid, nitrilotriacetic acid, N-methylaminodiacetic acid, iminodiacetic acid, diglycolic acid, malic acid, gluconic acid, acetylacetone, citric acid, tartaric acid, aconitic acid, suberic acid, tricarballylic acid, malonic acid, succinic acid, glutaric acid, mucic acid, and glycolic acid. Note that the ammonium salts of acids are also suitable. Preferred organic acids are glyoxylic acid, oxalacetic acid, 2-ketogulonic acid, alpha-ketoglutaric acid, 2-ketobutyric acid, pyruvic acid, keto-gluconic acid, thioglycolic acid, and glycolic acid. Most preferred are glyoxylic acid, pyruvic acid, and oxalacetic acid.

Organic acids suitable for use in the practice of the present invention include those containing a functional group selected from the group consisting of carboxylic acid —COOH, hydroxmate acid —NOH—C=O, hydroxo —OH, keto —C=O, amine: —NH$_2$, amide: —CO—NH$_2$, imine: CNOH, thiol: SH, epoxy: =COC=, and combinations thereof. These groups are traditionally categorized as metal binding groups or chelating agents, which form metal ligand complexes in aqueous solution. Without being bound by any particular theory, it is believed that complexation of the organic group during catalyst formation steps plays an important role.

In another embodiment, trimetallic catalyst precursors according to the invention may be prepared by the addition of the first row transition metal such as Co, Ni, or Zn to the Group VIB plus Group VIII metal components by several different methods. Once the catalyst precursor is sulfided, it becomes the catalyst composition. In one embodiment, the third metal component may be added to a commercially available hydrotreating catalyst. Such commercially available catalysts normally comprise at least one of Co, Mo, Ni or W on a carrier. Preferred commercially available hydrotreating catalysts are those containing Co and Mo supported on an alumina carrier. For example, a commercially available hydrotreating catalyst, such as RT-601, KF-757, or KF-848, available from Albemarle Catalyst Company, can be impregnated with a solution containing at least one of Co, Ni, or Zn components, followed by drying, optionally calcining, and sulfiding.

In yet another embodiment, a solution comprising Group VIB, Group VIII metal components and a third metal component, when the third metal is Zn, can be used to impregnate a support. After impregnation, the catalyst precursor goes through the conventional steps including drying, optionally calcining, and sulfiding.

In still another embodiment, a stepwise impregnation process can be used which involves impregnating a support with a solution comprising Group VIB and/or Group VIII components (the Group VIB and Group VIII metal components may be added in single step or stepwise). After drying and optionally calcining, the support with Group VIB and VIII metals will be impregnated with a solution comprising at least one of Co, Ni, or Zn components, followed by drying, optionally calcining, and sulfiding.

In yet another embodiment, a support can be impregnated with Group VIB metal followed by drying and optionally calcining, and then a Group VIII metal and third metal component can be added, when the third metal is Zn, together in same impregnation solution.

In still a further embodiment, a support can be impregnated with a solution, slurry, or mixture composed of a Group VIB metal, a Group VIII metal, and an organic complexing agent or additive, where the organic additive serves as a solvent. In such an embodiment, water is not used as a solvent. Instead, the organic complexing agent is used as the organic solvent. The Group VIB metal and Group VIII metal can be provided as salts. In a preferred embodiment, at least one of the Group VIB metal salt and the Group VIII metal salt are formed using an anion that is the conjugate base of the solvent. For example, when 2,4-pentanedione (acetylacetone) is used as a solvent, either the acetyl acetonate salt of a Group VIB metal, such as molybdenum, or the acetyl acetonate salt of a Group VIII metal, such as cobalt, or both could be used to form the solution, slurry, or mixture. In a preferred embodiment, impregnation of a catalyst with this type of solution is performed by using an amount of solution that is similar to the pore volume of the catalyst. For example, per volume of catalyst, the volume of solution used can be from about 0.9 times to 1.05 times the pore volume of the catalyst. Preferably, a sufficient level of metal can be impregnated in the support with a single impregnation using this type of solution. Example 16 provides further details regarding a catalyst formed according to this embodiment of the invention.

In various other embodiments, the impregnation solution may be an aqueous solution and includes a soluble Group VIII metal component, a soluble Group VIB metal component, at least one organic complexing agent and optionally, an organic additive. In embodiments where a solvent different from the organic complexing agent is used, the molar ratio of the organic complexing agent (such as carboxylic acid) to Group VIII metal component plus Group VIB metal component is from about 1 to 10, preferably at least about 2, and preferably less than about 6. In an alternative embodiment where the organic acid includes multiple acid functional groups (such as multiple —COOH groups), the ratio of organic acid functional groups to the group VIII metal component plus Group VIB metal component can be from about 1 to 10, preferably at least 2, and preferably less than 6. The Group VB/Group VIII metal component may be added as a metal compound of limited solubility, e.g., $CoCO_3$, provided that the metal compound of limited solubility reacts with the organic acid component to form a soluble metal component. The order of mixing of metal components is not critical and the process conditions for mixing process conditions during the mixing step are generally not critical. In an embodiment, it is preferred to solubilize metal components of limited solubility prior to adding the other metal components. It is, e.g., possible to add all components at ambient temperature at their natural pH (if a suspension or solution is applied), again provided that it is preferred to solubilize metal components of limited solubility prior to adding the other metal components.

An organic additive (other than the organic complexing agent) may also be added to the impregnation solution. If an organic additive is desired as part of the catalyst precursor, it may be added to the solution used to impregnate the carrier. The organic additive may be added together with Group VIB or Group VIII metals, may be added together with the third metal salt, or may be added separately to the impregnating solution. The amount of organic additive may range from a molar ratio of 0.01 to 5 moles additive per mole of Group VIB metal plus Group VIII metal.

In an embodiment, an organic additive can be a compound having 2 to 10 carbon atoms and containing at least 2 oxygen atoms, and includes polyols, glycols and ethers thereof and aldehydes or ketones. Examples of such additives include glyoxal, glycerol, ethylene glycol, propylene glycol, dipropylene glycol, trimethylol propane, diethylene glycol, triethylene glycol, tetraethylene glycol, ethylene glycol monoethyl ether, ethylene glycol monobutyl ether. Organic additives having at least 2 oxygen atoms include polyethylene glycols having a molecular weight less than 600.

Still other additives are compounds having at least 2 nitrogen atoms and having 2-10 carbon atoms. Examples include ethylenediamine, propylene diamine, 1,3-diaminobutane, and 1,3-pentanediamine. Other additives include compounds having at least one oxygen atom and one nitrogen atom, such as ethanol amine, diethanol amine and triethanol amine. In yet another embodiment, the organic additive can be composed of two or more suitable organic additive compounds.

During preparation and mixing of the impregnation solution, it is generally preferred to keep the temperature below the boiling point of the solvent, such as water, to facilitate easy handling of the components. However, if desired, temperatures above the solvent boiling point or different pH values can be used. If the reaction during the mixing step is carried out at increased temperatures, the suspensions and solutions that are added during the mixing step are preferably preheated to an increased temperature which can be substantially equal to the reaction temperature.

The impregnation solution is then added to the support (the support preferably having the pore volume range noted above), preferably at temperatures from 20 to 80° C., using the incipient wetness technique. The volume of the impregnation solution may be more than the water pore volume of the support, for example, 1.2 times the water pore volume, in order to increase the amount of metal oxides on the support. Preferably, the support should be mixed, such as gently stirred, as impregnation solution is added to the fresh support to ensure even distribution of the metal compounds over the support. In incipient wetness impregnation, the water pore volume of the support is determined first. The same volume of the impregnation solution is added to the support so that all solution would go into the support. A slightly larger volume may be used to get more metals onto the support. For example, if the water pore volume of the support is 1.22 cc/g of support, 1.5 cc (23% more) of impregnation solution can be used for every gram of support. This is illustrated infra in Example 1.

The impregnated support may then be dried and subjected to at least one additional impregnation cycle. Typically, samples are dried at temperatures and for a time sufficient to dry the sample. Such temperatures may be from about 60-120° C. in air or inert atmosphere. The impregnated support may also be heated at drying temperatures of from 200 to 450° C. for a time sufficient to yield a partially calcined catalyst having a residual organic carbon content of at least 5 wt. %, based on the calcined catalyst. It is believed that calcination makes more pore volume accessible for the following impregnation. The impregnation and mixing conditions may be the same as noted above for subsequent impregnation cycles following the first impregnation cycle.

If the total metals content of the supported catalyst precursor attains the target metals content, further impregnation cycles are not needed. If the target metals content is not attained, the impregnation cycles are continued until the desired metals content is attained. The amount of metals on the support may be calculated based on the metal concentrations and volumes of the impregnation solution used for the impregnation. The metal contents may be further verified by any suitable analytical techniques for metals content, such as ICP, XRF, and the like.

The impregnated support is then dried. In embodiments involving forming a catalyst precursor on a support, an optional first drying step may be used, where drying temperatures are those sufficient to remove water from the impregnated support and may range from about 60 to 120° C., in air or an inert atmosphere such as nitrogen. After the optional drying step, the impregnated support is further exposed to drying temperatures of from about 200 to 500° C., preferably 200 to 450° C., more preferably at least 300° C., and more preferably less than 400° C., to produce a partially calcined catalyst precursor. Note that the desired drying step may vary depending on the nature of the organic components. This further heating is continued for a time effective to partially decompose organic components including organic acids and any organic additives to organic residues, which can be characterized in terms of residual organic carbon. In an embodiment, at least a portion of the organic residue remains on the catalyst precursor, so that residual organic carbon constitutes about 5 to 20 wt. %, preferably at least 10 wt. %, and preferably 15 wt. % or less, of the weight of the catalyst precursor (includes support, metal complexes, and organic residual carbon). Note that the organic residues remaining in the catalyst precursor after drying are no longer in the form of the original organic additive(s) or organic complexing agent(s) that were impregnated on the support. While an organic residue is maintained on the partially calcined support, the original organic additive has been chemically decomposed or reacted into a different form.

While not wishing to be bound to any theory, the organic residue may influence metal dispersion and may help avoid unwanted crystalline phases. The residual organic carbon content of a catalyst precursor or catalyst may be analyzed by any conventional carbon analysis instrument, such as LECO carbon analyzer manufactured by the LECO Corporation. The effective amount of time for decomposition will be that needed to reach the desired residual organic carbon content and will generally range from about 1 second to about 24 hours. In another preferred embodiment, the furnace is ramped from room temperature to about 325° C. in one hour. The drying/partial calcination/decomposition can be carried out in the presence of: flowing oxygen-containing gas (air), flowing nitrogen, or static air or inert gas (no gaseous supply). It is preferred to carry out the calcination in the presence of an inert gas such as nitrogen.

The drying/partial calcination/decomposition step can be combined with the preceding optional drying step as a single continuous step. It will be understood that the preparation conditions are controlled and designed so that the mixed solution does not go through violent evaporation, spill or interruption during the entire drying/partial calcination sequence.

Finally, it is preferred to sulfide the at least partially calcined catalyst precursor prior to or during the hydroprocessing process. Sulfiding the catalyst precursor produces the catalyst composition. The sulfiding process may take place ex situ or in situ and in the gas phase or liquid phase. In the ex situ process the catalyst precursor is contacted with a sulfiding agent such as hydrogen sulfide and hydrogen, e.g., 10% $H_2S$/$H_2$, at elevated temperatures for a period of time sufficient to sulfide the catalyst precursor. In the in situ process, the catalyst precursor is loaded into the hydrotreating reactor and contacted with hydrogen containing a sulfiding agent such as hydrogen sulfide in the presence or absence of a hydrocarbon feed. The hydrogen sulfide may also be provided directly by decomposition of an additive (spiking agent) added either directly to the hydrogen treat gas or to the feedstock. Spiking agents which may serve as a hydrogen sulfide precursor include at least one of carbon disulfide, thiophene, mercaptan, organic sulfide, dialkyl disulfide, diaryl disulfide and organic polysulfide, preferably dimethyl sulfide or dimethyl disulfide. Alternatively, the catalyst precursor could be loaded with sulfur compounds that decompose to $H_2S$ when treated under hydrogen at elevated temperature for a period of time sufficient to sulfide the catalyst precursor.

In embodiments where an existing supported metal-containing catalyst is impregnated with an additional metal, lower drying temperatures may be used. In such embodiments, the drying temperature can be from about 100° C. to about 450° C.

Hydroprocessing Process

The term "hydroprocessing" encompasses all processes in which a hydrocarbon feed is reacted with hydrogen at effective temperatures and pressures, and include hydrogenation, hydrotreating, hydrodesulfurization, hydrodenitrogenation, hydrodemetallation, hydrodearomatization, hydroisomerization, hydrodewaxing, and hydrocracking including selective hydrocracking. Preferred hydroprocessing processes include hydrotreating. Preferred hydrotreating include hydrodesulfurization and hydrodenitrogenation.

Hydrotreating conditions involve temperatures in the range 150° C. to 400° C., preferably 200° C. to 400° C. at pressures in the range of 740 to 20786 kPa (100 to 3000 psig), preferably 1480 to 13891 kPa (200 to 2000 psig), a space velocity of from 0.1 to 10 LHSV, preferably 0.5 to 5 LHSV, and a hydrogen treat gas rate of from 89 to 1780 $m^3/m^3$ (500 to 10000 scf/B), preferably 178 to 890 $m^3/m^3$ (1000 to 5000 scf/B).

Hydrotreating typically reduces nitrogen and sulfur contaminants in the feedstock by converting these contaminants to ammonia and hydrogen sulfide, respectively. These gaseous contaminants may be separated from the hydrotreated feedstock using conventional techniques such as strippers, knockout drums and the like.

The hydrotreating reaction stage can be comprised of one or more fixed bed reactors or reaction zones each of which can comprise one or more catalyst beds of the hydroprocessing catalyst. Although other types of catalyst beds can be used, fixed beds are preferred. Such other types of catalyst beds include fluidized beds, ebullating beds, slurry beds, and moving beds. Interstage cooling or heating between reactors or reaction zones, or between catalyst beds in the same reactor or reaction zone, can be employed since the desulfurization reaction is generally exothermic. A portion of the heat generated during hydrotreating can be recovered. Where this heat recovery option is not available, conventional cooling may be performed through cooling utilities such as cooling water or air, or through use of a hydrogen quench stream. In this manner, optimum reaction temperatures can be more easily maintained. It is also within the scope of this invention to use other catalysts in the case of multiple catalyst beds. Such other catalysts may comprise conventional hydroprocessing catalysts.

The subject hydrotreating catalysts possess high activity for the HDS and HDN of distillate fuels. The multiple impregnation sequence of catalyst supports having large pore volumes with metal components in amounts as defined above followed by calcination effective to produce controlled amounts of organic residues, and sulfiding leads to high activity catalysts.

The following examples will serve to illustrate, but not limit this invention.

EXAMPLE 1

This example is directed to catalyst preparation. Catalysts were prepared using commercially available alumina supports having the following properties:

(1) SC-1735: Davicat AL-2700, large pore alumina beads with particle diameters in the range of 1.2-2.4 mm, BET SA: 150 $m^2/g$, Hg pore volume: 1.16 cc/g, median pore diameter by Hg: 299 Å, density: 0.45 g/cc, water pore volume: 1.14 cc/g, water pore volume per cc of support: 0.51 cc/cc.

(2) SC-1736: Davicat AL-2750, large pore alumina beads with particle diameters in the range of 2.4-4.8 mm, BET SA: 244 $m^2/g$, Hg pore volume: 1.23 cc/g, median pore diameter by Hg: 162 Å, density: 0.43 g/cc, water pore volume: 1.22 cc/g, water pore volume per cc of support: 0.52 cc/cc.

The following procedure was used for impregnating the above alumina supports with a solution. Cobalt carbonate was mixed with citric acid in a citric acid to Co molar ratio of 1.2 and the aqueous mixture heated at 50° C. until the cobalt carbonate dissolved. Ammonium heptamolybdate was added in an Mo/Co ratio of 2:1 to the resulting solution and stirred without further heating until the ammonium heptamolybdate dissolved. Additional citric acid was added to the resulting solution to adjust the citric acid:cobalt molar ratio to 1.8. Note that citric acid includes 3 —COOH functional groups. Thus, the molar ratio of —COOH functional groups to cobalt was 5.4, and the molar ratio —COOH functional groups to (Mo+Co) was 1.8. Ethylenediamine was slowly added to the solution with stirring until the ethylenediamine:Co ratio was 1.8 to form the impregnation solution.

Alumina support SC-1736 was impregnated with the impregnation solution at a ratio of 1.5 ml per gram of support. The impregnated support was heated under nitrogen flow at 110° C. for 4 hr and at 375° C. for 4 hr. The cooled support was impregnated in a second cycle with the same impregnation solution at a ratio of 1.34 ml per gram of support. The support was then heated under nitrogen flow at 110° C. for 4 hr and at 375° C. for 4 hr.

EXAMPLE 2

This example is directed to the catalyst testing protocol. A catalyst was prepared by a double impregnation of support SC-1735 with a solution containing Co, Mo, citric acid (citric acid:Co molar ratio of 1.8) and ethylene glycol (ethylene glycol:citric acid molar ratio of 1.8). The impregnated support contained 442 mg $MoO_3$ and 115.1 mg CoO per 1 ml of support after calcining at 375° C. under nitrogen. The calcined support was sulfided in situ at 500 psi (3448 kPa) and a treat gas rate of 700 Scf/B (125 $m^3/m^3$), and tested for HDS activity in a reactor with a catalyst loading of 1.0 cc. In comparison, the commercially available Ketjenfine® 757 (KF-757) was evaluated in a parallel reactor under the same condition. After an in-situ sulfiding step, the catalysts were subjected to a virgin distillate feed (Feed #1 in Table 1) at a temperature of 625° F., a total of 500 psig pressure, and a hydrogen gas treat rate of 700 SCF/B. After 144 hr of running on feed, the catalyst HDS activity (volumetric) was 225% of the commercially available catalyst (KF-757) run under the same conditions on the basis of 1.5 order kinetics.

The test feed was then changed to another distillate feed (Feed #2 in Table 1), and the test condition was changed to these lower pressure conditions: a total pressure of 220 psig, 625° F., and a hydrogen gas treat rate of 700 SCF/B. Catalyst activity was 135% when compared to KF-757 under the same conditions.

TABLE 1

Hydrocarbon feedstock used to compare catalyst hydrodesulfurization and hydrodenitrogenation.

| | Sulfur, wt % | Nitrogen, ppm | API | Aromatics, wt % | T95, ° F. |
|---|---|---|---|---|---|
| Feed #1 | 1.86 | 167 | 32.2 | 32.8 | 773 |
| Feed #2 | 0.45 | 39 | 37.9 | 25.7 | 670 |

EXAMPLE 3

A catalyst was prepared by a double impregnation of support SC-1736 with a solution containing Co, Mo, citric acid (citric acid:Co molar ratio of 1.8) and ethylenediamine(ethylenediamine:Co molar ratio of 1.8). The impregnated support contained 475 mg $MoO_3$ and 123.6 mg CoO per 1 ml of support after calcining at 375° C. under nitrogen. The calcined support was sulfided in situ at 500 psi (3448 kPa) and a treat gas rate of 700 Scf/B (125 $m^3/m^3$) and tested for HDS activity in a reactor with a catalyst loading of 1.0 cc. In comparison, commercially available KF-757 was evaluated in a parallel reactor under the same condition. After an in-situ sulfiding step, the catalysts were subjected to a virgin distillate feed (Feed #1 in Table 1) at a temperature of 625° F., a total of 500 psig pressure, and a hydrogen gas treat rate of 700 SCF/B. After 144 hr of running on feed, the catalyst HDS activity was 300% of the KF-757 run under the same conditions.

EXAMPLE 4

A catalyst was prepared using the procedure of Example 1, where an alumina support (SA6578, BET surface area=150 $m^2/g$) was double impregnated with a solution containing Co, Mo, pyruvic acid (pyruvic acid:Co molar ratio of 3.55). The support was calcined at 375° C. under nitrogen. Its metal content in terms of metal oxides was 44 wt %. Carbon content was 14.2 wt %. The calcined support was sulfided in situ at 500 psi (3448 kPa) and a treat gas rate of 700 Scf/B (125 $m^3/m^3$) and tested for HDS activity in a reactor with a catalyst loading of 1.0 cc. In comparison, commercially available KF-757 was evaluated in a parallel reactor under the same condition. After an in-situ sulfiding step, the catalysts were subjected to a virgin distillate feed (Feed #1 in Table 1) at a temperature of 640° F., a total of 500 psig pressure, and a hydrogen gas treat rate of 700 SCF/B. After 336 hr of running on feed, the catalyst HDS activity was 160% of the KF-757 run under the same conditions on a basis of 1.5 order kinetics.

EXAMPLE 5

The following procedure was used for impregnating alumina supports. 8.66 g pyruvic acid was mixed with 6.88 g cobalt acetate tetrahydrate to make a uniform slurry. 9.76 g ammonium heptamolybdate (AHM) tetrahydrate was dissolved in 10.25 g DI water at 40° C. The AHM solution was added slowly to the slurry without heating under stirring. Stirring was continued until all cobalt acetate was dissolved. The resulting solution (Co/Mo/pyruvic acid) had the following concentrations: 1.1 M Co; 2.2 M Mo; pyruvic acid/Co molar ratio=3.55. After the preparation of the impregnating solution was completed, 1.2 g of SC-159 alumina (sized to 90-300 μm) was impregnated with 1.62 g of the Co/Mo/pyruvic acid solution and heated under flowing $N_2$ according to the following furnace conditions: 20° C. to 55° C. at 1° C./min; hold at 55° C. for 10 min; 55° C. to 120° C. at 0.3° C./min; hold at 120° C. for 4 hr; from 120° C. to 330° C. at 1.2° C./min, hold at 330° C. for 4 hr. The resulting material was impregnated a second time with 1.54 g of the same solution and heated in the same manner as the $1^{st}$ impregnation. The final material was re-sized to 90-300 μm and tested for hydrodesulfurization and hydrodenitrogenation.

Alternatively, 1.1 g of SA-6175—Saint-Gobain N or Pro— (sized to 90-300 μm) was impregnated with 2.21 g of Co/Mo/pyruvic acid solution, as described above, and heated in the same manner as the catalyst described above. The resulting material was impregnated a second time with 1.99 g of the same solution and heated again in the same manner. The final material was re-sized to 90-300 μm and tested for hydrodesulfurization and hydrodenitrogenation.

The calcined materials were sulfided in situ at 500 psi (3448 kPa) and a treat gas rate of 700 Scf/B (125 m$^3$/m$^3$) and tested for HDS activity in a reactor with a catalyst loading of 1.0 cc. In comparison, commercially available KF-757 was evaluated in a parallel reactor under the same conditions. After the in-situ sulfiding step, the catalysts were subjected to a virgin distillate feed (Feed #1 in Table 1) at a temperature of 625° F., a total of 500 psig pressure, and a hydrogen gas treat rate of 700 SCF/B. After about 160 hr of running on feed, the temperature was adjusted to 640° F. After about 380 hr of running on feed, the first catalyst displayed HDS activity 150% of the KF-757 run under the same conditions on a basis of 1.5 order kinetics while the second catalyst displayed HDS activity 225% of KF-757.

EXAMPLE 6

Most attempts to explain the synergistic effect seen in Co/Ni/Mo/W hydrotreating catalysts emphasize the "average heat of formation", bond energy, etc. of the metal sulfur bond/cluster towards an optimum value for the HDS reaction (see, e.g., Chianelli, et. al., *Journal of Catalysis* 86, 226-230 (1984)). In the "average heat of formation model" the synergistic M'Mo sulfide pairs possess an average heat of formation of ~40 kcal/mol.

TABLE 2

Average Heats of Formation of bimetallic M'$_x$S$_y$/MoS$_2$
From Chianelli, et.al., Journal of Catalysis 86, 226-230 (1984).

| M-S compound | Heat of Formation (kcal/mol) | Average Heat of Formation with MoS$_2$ (kcal/mol) |
|---|---|---|
| MoS$_2$ | 65.8 | 65.8 |
| MnS | 51.1 | 58.5 |
| FeS$_2$ | 42.3 | 54.2 |
| FeS | 24 | 44.9 |
| Co$_9$S$_8$ | 19.8 | 42.8 |
| Ni$_3$S$_2$ | 17.2 | 41.5 |
| CuS | 12.7 | 39.3 |
| ZnS | 46 | 57.3 |

As can be seen from the above heats of formation, in this simplistic model Co and Ni should function as promoters for MoS$_2$ (as expected), but Cu and possibly Fe should also act as HDS promoters of MoS$_2$. The promotion activity of Cu and Fe is not normally observed. This discrepancy in observed vs. calculated activity is ascribed to electronic effects outlined in Harris & Chianelli, *Journal of Catalysis* 98, 17-31 (1986) where the concepts of the covalent contribution to metal-sulfur bond strength and the number of "d" electrons in the highest occupied molecular orbital are combined into a single "Activity Parameter". This activity parameter adequately predicts the synergy observed in the CoMo and NiMo systems and explains why little or no promotion is observed in the Cu and Fe systems.

TABLE 3

Activity Parameter and HDS Activity bimetallic M'$_x$S$_y$/MoS$_2$
From Harris & Chianelli, Journal of Catalysis 98, 17-31 (1986).

| Catalyst Phase | | HDS Activity (DBT molecules × 10$^{16}$ S$^{-1}$ m$^{-2}$) | Activity Parameter |
|---|---|---|---|
| MoS$_2$ | MoS$_2$ | 0.62 | |
| MoS$_2$ | MoS$_2$ | 0.76 | |
| Mn/Mo | MnS + MoS$_2$ | 1.07 | 400 |

TABLE 3-continued

Activity Parameter and HDS Activity bimetallic M'$_x$S$_y$/MoS$_2$
From Harris & Chianelli, Journal of Catalysis 98, 17-31 (1986).

| Catalyst Phase | | HDS Activity (DBT molecules × 10$^{16}$ S$^{-1}$ m$^{-2}$) | Activity Parameter |
|---|---|---|---|
| Fe/Mo | FeS$_x$ + MoS$_2$ | 1.55 | 400 |
| Co/Mo | Co$_9$S$_8$ + MoS$_2$ | 2.60 | 575 |
| Ni/Mo | Ni$_3$S$_2$ + MoS$_2$ | 4.01 | 700 |
| Cu/Mo | CuS$_x$ + MoS$_2$ | 0.41 | 200 |
| Zn/Mo | ZnS + MoS$_2$ | 1.34 | 400 |

Note:
"Activity Parameter" is estimated from graphs, exact numerical values not listed in paper

EXAMPLE 7

Synthesis of Bimetallic CoMo/alumina Catalyst A

Citric acid, cobalt carbonate, and ammonium paramolybdate were combined in water in a 0.72:0.48:1.0 ratio and stirred to dissolve. An alumina support was impregnated with the citric acid—cobalt—molybdate solution to incipient wetness and dried at 110° C. The concentration of MoO$_3$ was 164 mg/mL of support.

EXAMPLE 8

Third Metal Addition to Bimetallic CoMo/alumina Catalyst A

To the bimetallic catalyst of Example 7 was added a third metal at the third metal:Co ratios found in Table 4 (see Example 13). When the third metal was Fe, Co, Ni, Cu, Zn, the metal acetate was dissolved in a 1.0 M aqueous solution of citric acid and added to the CoMo/alumina to incipient wetness. When the third metal was manganese, the aqueous acetate was added directly to the CoMo/alumina to incipient wetness. The impregnated support was dried at 110° C.

EXAMPLE 9

Synthesis of Bimetallic CoMo Catalyst B

Citric acid and ammonium paramolybdate were dissolved in water at a 0.5:1.0 molar ratio. An alumina support was impregnated with the citric acid-molybdate solution to incipient wetness, dried at 110° C., and calcined at 425° C. After calcination the concentration of MoO$_3$ was 294 mg/mL of support. Cobalt carbonate was dissolved in an aqueous citric acid solution where the molar ratio of Co metal to citric acid was 1:1.8, the Co solution was combined in a 2:1 ratio and then added to the Mo catalyst precursor so that the ratio of Co:Mo was 0.48:1.0. The catalyst was dried at 110° C.

EXAMPLE 10

Third Metal (Zinc) Substituted for Cobalt

Citric acid and ammonium paramolybdate were dissolved in water at a 0.5:1.0 molar ratio. An alumina support was impregnated with the citric acid—molybdate solution to incipient wetness, dried at 110° C., and calcined at 425° C. After calcination the concentration of MoO$_3$ was 294 mg/mL of support. Cobalt carbonate and zinc hydroxycarbonate were each dissolved separately in an aqueous citric acid solution where the molar ratio of Co and Zn metals to citric acid in each solution was 1:1.8, the Co and Zn solutions were combined in a 2:1 ratio and then added to the Mo catalyst precursor so that the ratios of Co:Mo and Zn:Mo were 0.32:1.0 and 0.16:1.0, respectively. The catalyst was dried at 110° C.

EXAMPLE 11

Synthesis of High Cobalt CoMo/Alumina Catalyst

This catalyst was made similar to bimetallic CoMo/alumina catalyst B, but the Co:Mo ratio was 0.72:1.

EXAMPLE 12

Sulfiding

This example is directed to a description of a sulfiding and reaction testing protocol. Reactions were performed in parallel in a multi-well, high pressure reactor. In this reactor aluminum vials containing catalyst and oil were placed in a reactor shell that was pressurized with reaction gas and heated to high temperatures, so as to maintain the vials at substantially the same temperature. During reaction (and sulfiding) the entire shell was shaken at 500 rpm to provide mixing of the catalyst and oil in the individual vials. Access of the gas into each of the vials was controlled by a restrictive orifice over each vial. The feed used in these reactions was a blend of hydrotreated distillates containing 630 wppm S and 365 wppm N.

Known volumes and masses of catalysts (70 μl) were charged to aluminum vials (6 cc) along with 2.5 cc of liquid feed. Catalysts were sulfided in the liquid phase in the blend of hydrotreated distillate feedstocks at 400 psi under an atmosphere of 10% $H_2S$ in $H_2$ at temperatures as high as 315° C. After such treatment the sulfided catalysts were transferred under nitrogen to an inert atmosphere glove box where the sulfided feed was removed and the catalysts washed 4 times with 3.5 cc of fresh feed. After such washing fresh feed (1.85 cc) was charged to each vial.

The vials were then placed back in the reactor, pressurized to 200 psi with fresh reaction gases (3% $H_2S$ in $H_2$) and heated to reaction temperature (330° C.) for 24 hours. Once the reaction was complete the product liquid was analyzed for sulfur and nitrogen content.

EXAMPLE 13

Testing of Third Metal Addition Catalysts

Figure 1:
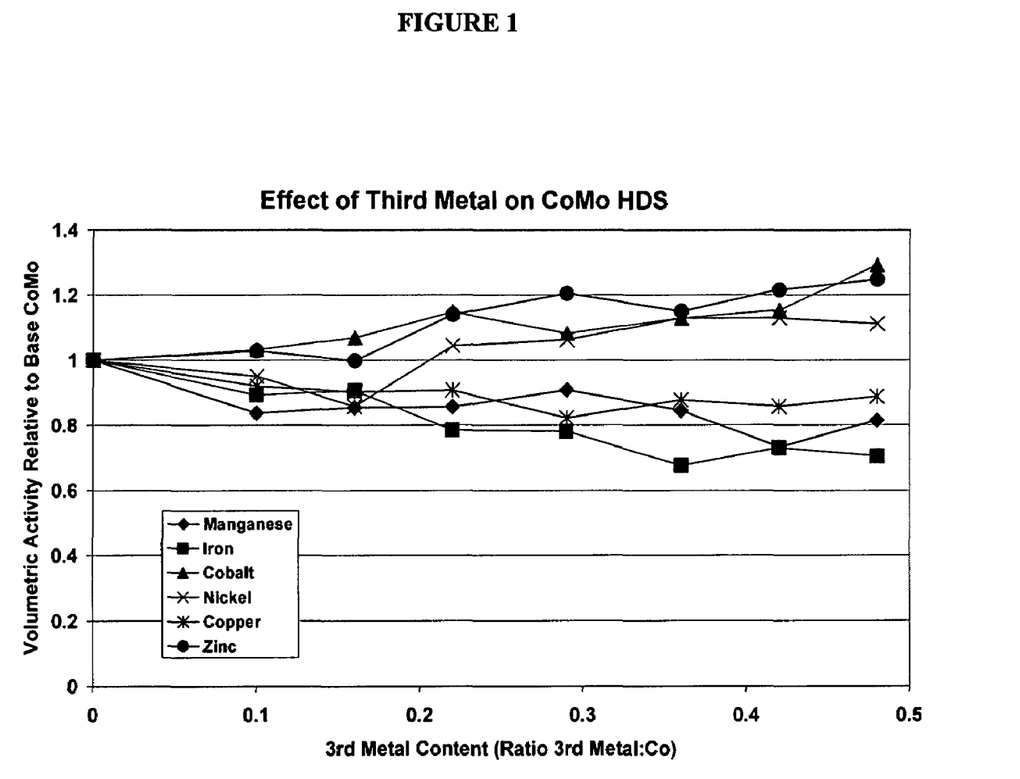
FIG. 1 is a graph showing the effect on the relative volumetric activity of third metal addition on a CoMo HDS catalyst.

When Mn, Fe, and Cu were added to the bimetallic CoMo catalyst A, the activity of the third metal addition catalysts were lower than comparative bimetallic CoMo/alumina catalyst A. In contrast, when Co, Ni, and Zn were added to the comparative bimetallic catalyst A, the activity of the third metal addition catalyst was greater than the comparative bimetallic catalyst A, and in general activity increased with the loading of the third metal. The ratio of Co:Mo in comparative bimetallic catalyst A was 0.48:1.0, which as is well known in the art is close to the optimum CoMo ratio of 0.5:1 for the combination of Group VIB and Group VIII catalysts. Thus it is surprising that further addition of Co and Ni in a subsequent step improved the performance of the third metal catalysts. Even more surprising, addition of Zn to comparative bimetallic catalyst A yielded a third metal addition catalyst with greater activity than comparative bimetallic catalyst A. Based on literature in Example 1, Zn addition was expected to perform similarly to Mn or Fe. The results are summarized in FIG. 1 and in Table 4. FIG. 1 is a graph showing the effect of third metal on a CoMo HDS catalyst on the relative volumetric activity. Table 4 is a summary of the effect of third metal on CoMo HDS.

TABLE 4

Effect of Third Metal on CoMo HDS

| $3^{rd}$ Element | $3^{rd}$ Element/Co ratio | Relative Volumetric Activity to Base Bimetallic CoMo |
|---|---|---|
| Mn | 0.1 | 0.84 |
|  | 0.16 | 0.85 |
|  | 0.22 | 0.86 |
|  | 0.29 | 0.91 |
|  | 0.36 | 0.84 |
|  | 0.42 | 0.73 |
|  | 0.48 | 0.81 |
| Fe | 0.1 | 0.89 |
|  | 0.16 | 0.91 |
|  | 0.22 | 0.78 |
|  | 0.29 | 0.78 |
|  | 0.36 | 0.68 |
|  | 0.42 | 0.73 |
|  | 0.48 | 0.71 |
| Co | 0.1 | 1.03 |
|  | 0.16 | 1.07 |
|  | 0.22 | 1.15 |
|  | 0.29 | 1.08 |
|  | 0.36 | 1.13 |
|  | 0.42 | 1.15 |
|  | 0.48 | 1.29 |
| Ni | 0.1 | 0.95 |
|  | 0.16 | 0.86 |
|  | 0.22 | 1.04 |
|  | 0.29 | 1.06 |
|  | 0.36 | 1.13 |
|  | 0.42 | 1.13 |
|  | 0.48 | 1.11 |
| Cu | 0.1 | 0.92 |
|  | 0.16 | 0.90 |
|  | 0.22 | 0.91 |
|  | 0.29 | 0.82 |
|  | 0.36 | 0.88 |
|  | 0.42 | 0.86 |
|  | 0.48 | 0.89 |
| Zn | 0.1 | 1.03 |
|  | 0.16 | 1.00 |
|  | 0.22 | 1.14 |
|  | 0.29 | 1.20 |
|  | 0.36 | 1.15 |
|  | 0.42 | 1.22 |
|  | 0.48 | 1.25 |

EXAMPLE 14

Testing of Third Metal (Zinc) Substituted for Cobalt

Substitution of one-third the Co for Zn while maintaining a total Zn+Co vs. Co ratio with Mo constant at 0.48:1 yielded a ZnCoMo/alumina catalyst with 1.11:1.0 activity ratio relative to bimetallic catalyst B. Thus Zn may be substituted for Co in standard catalyst syntheses with retention and even promotion of performance.

EXAMPLE 15

Testing of High Cobalt CoMo/Alumina Catalyst

Increasing the Co:Mo ratio to 0.72:1.0 from 0.48:1.0, from cobalt added in one-step, decreased the catalyst activity to 0.86:1.0 relative to bimetallic catalyst B. The activity of this catalyst is significantly lower than the third metal addition catalyst when the third metal as cobalt was added to a similar level in a second step according to the invention as seen in Table 4.

EXAMPLE 16

This example is directed to preparing a catalyst using a Group VIB metal, a Group VIII metal, and an organic additive. In this example, the organic additive functions as an organic solvent. Water was not included in the solution used to prepare the following catalyst, although minor amounts of water could be present in the solution without harming the resulting catalyst. Cobalt and molybdenum were supported on an alumina support by using the acetyl acetonate salts (Co—AcAc and Mo—AcAc) as precursor compounds. Acetyl acetonate was used as the organic solvent. After impregnation, the catalysts were calcined in nitrogen before catalyst sulfidation. The catalysts thus prepared were evaluated side-by-side with RT-225 and KF-757, commercial CoMo/$Al_2O_3$ catalysts available from Albemarle Catalyst Company. For further comparison, a catalyst of CoMo/$Al_2O_3$ was also made with cobalt nitrate and ammonium heptamolybdate.

CoMo/$Al_2O_3$ Prepared by Impregnation of Cobalt Nitrate and Ammonium Heptamolybdate $Al_2O_3$ was selected as a support to deposit CoMo metal oxides. The support had a surface area of 306 $m^2/g$, a 0.85 $cm^3/g$ pore volume, and a pore size centered on 73 Å, as determined by BET data taken from $N_2$ desorption profiles. The Co and Mo precursor compounds used in the preparation were cobalt nitrate hexahydrate and ammonium heptamolybdate tetrahydrate. A mixture solution containing Co and Mo precursor compounds was prepared according to the following procedure. Cobalt nitrate hexahydrate was dissolved in distilled $H_2O$. Then, an appropriate amount of ammonium heptamolybdate tetrahydrate was added to make the final solution. The catalyst of CoMo/$Al_2O_3$ was prepared by an incipient wetness technique. After impregnation, the catalyst was dried at 160° F. under vacuum overnight for 14 hr. To impregnate 15 g of alumina support, 4.99 g of cobalt nitrate tetrahydrate was dissolved in 10 g of distilled water, and 6.29 g of ammonium heptamolybdate tetrahydrate was added into the solution. The volume of the final solution used in impregnation was adjusted according to the pore volume of the support. The metals content of the catalysts were 6% cobalt as CoO, and 24% molybdenum as $MoO_3$.

CoMo/$Al_2O_3$ Prepared by Impregnation of Co(AcAc)$_2$ and $MoO_2(AcAc)_2$

In order to carry out the following inventive example, first a solution of $MoO_2(AcAc)_2$ was prepared. For example, 90 g of ammonium heptamolybdate tetrahydrate $(NH_4)_6Mo_7O_{24}4H_2O$ was dissolved in 180 g of a solution of 15% aqueous ammonia. 210 ml of 2,4-pentanedione (HAcAc) was added into the mixture solution. The molar ratio of HAcAc/Mo was 4. Then 150 ml of concentrated nitric acid (70%, density 1.40) was slowly added to the mixture solution. When the solution was cooled to room temperature, a yellow precipitate was formed. The solid precipitate was recovered by filtration, washed with distilled water and ethanol respectively, and then dried in a vacuum oven at 140° F. for 14 hrs.

A CoMo—AcAc/$Al_2O_3$ catalyst was prepared by an incipient wetness technique. The $Al_2O_3$ support mentioned above was used as a support. The Co and Mo precursor compounds used in the preparation were cobalt 2,4-pentanedione or Co(AcAc)$_2$ and $MoO_2(AcAc)_2$. A solution containing Co—AcAc and Mo—AcAc was prepared as following: to impregnate 15 g of alumina support, 12.14 g of $MoO_2$(AcAc)$_2$ and 4.57 g of Co(AcAc)$_2$ were dissolved in 10 ml of HAcAc. The mixture solution was heated on a hot plate around 80° C. to facilitate CoMo—AcAc dissolution. The volume of the final solution used in impregnation was adjusted according to the pore volume of the support. The metals content of the catalyst was 6% cobalt as CoO, and 24% molybdenum as $MoO_3$.

The $Al_2O_3$ support was then impregnated with the solution. An amount of solution roughly equal to the pore volume of the support (per volume of support) was used during impregnation. After impregnation, the catalyst was dried at 160° F. under vacuum overnight for 14 hrs. Then catalyst calcination was carried out in a nitrogen atmosphere. Before calcination, the furnace was purged with nitrogen for 2 hrs to remove any residual oxygen inside. The furnace was ramped from room temperature to 617° F. (325° C.) over a 1 hr period under nitrogen. The catalyst was calcined at 617° F. (325° C.) for 4 hrs. The $N_2$ flow rate was adjusted at 5 volume/volume catalyst/minute. The calcined catalyst contained 5.5 wt % CoO, 24 wt % $MoO_3$, and 5.5 wt % C by analyses. The CoMo metals content was close to the target catalyst metals content of 6 wt % CoO and 24 wt % $MoO_3$.

The CoMo—AcAc catalyst contains about 5.5 wt % of residual carbon incorporated in catalyst, which may limit the growth of CoMo oxides. Without being bound by any particular theory, it is believed that the carbon may form a framework that assists in maintaining separated, smaller crystallites of CoMo oxides. As a result, it is believed that the carbon framework improves the dispersion of the CoMo oxides. After sulfidation, the highly dispersed CoMo oxides are converted into highly dispersed sulfides.

The two types of Co/Mo $Al_2O_3$ catalysts described in this example were subjected to a series of characterization tests, including oxygen chemisorption, temperature programmed sulfidation, X-ray diffraction, and an evaluation of diesel hydrodesulfurization.

Oxygen Chemisorption

The two types of CoMo/$Al_2O_3$ catalysts described above were dried under helium with flow rate of 60 ml/min to 650° F., and then cooled to 300° F. Helium was replaced with a mixture of 10% $H_2S/H_2$ gas and the sample temperature was increased to 450° F. and held for 1 hr. Maintaining the $H_2S/H_2$ gas flow, the sample temperature was increased to 650° F. and held at this temperature for 1 hr. The sample was then cooled under flowing $H_2S/H_2$ to 212° F. $H_2S/H_2$ was replaced by flowing helium and the sample was cooled to ambient temperature. A mixture of 10% $O_2$/He was swept into the reactor in discrete pulses of 250 microliters at 2 min intervals with 1.5 min purge between pulses. Complete titration of the active sites by the oxygen, termed as "breakthrough", is achieved when sequential peak areas stabilize and the measured peak area of a given pulse decreases slightly from that of the previous pulse. Oxygen concentration, pulse volume and pulse area/count were used to calculate the micromoles of oxygen consumed in the titration of the active sulfided metal sites.

Table 5 shows the oxygen uptake and cobalt dispersion of the two CoMo catalysts described in this Example, and RT-225, a catalyst that is commercially available from Albemarle Catalyst Company. RT-225 is a CoMo catalyst supported on alumina that has a CoO content of 1.2 wt % and a $MoO_3$ content of 4.2 wt %. The oxygen chemisorption data indicate that CoMo sulfides were better dispersed on $Al_2O_3$ when CoMo—AcAc precursor compounds were used to prepare the catalyst rather than the AHM and/or nitrate precursors. The CoMo—AcAc catalyst has the highest oxygen uptake among the catalysts, with a value of 272 µmol/g (Table 5). $CoMo/Al_2O_3$ prepared from cobalt nitrate and ammonium heptamolybdate has the lowest cobalt dispersion of 17.6%. Cobalt dispersion was calculated by assuming that oxygen uptake is only from Co sulfide, and Mo sulfide makes no contribution to the oxygen uptake. The commercial catalyst A has the highest metal dispersion. Because it has low metal loading, the overall oxygen uptake is low.

TABLE 5

| Samples | $O_2$ Uptake, µ-mole/g | Co dispersion, % |
|---|---|---|
| RT-225: 1.2% CoO + 4.2% $MoO_3/Al_2O_3$ | 90.0 | 40.3 |
| 6% CoO + 24% $MoO_3/Al_2O_3$-Nitrate | 141 | 17.6 |
| 6% CoO + 24% $MoO_3/Al_2O_3$—AcAc | 272 | 33.9 |

The surface area of the CoMo—AcAc/$Al_2O_3$ after calcination in nitrogen is 244 $m^2$/g. This catalyst has a pore volume of 0.51 cc/g with a pore size centered at 74 Å. The surface area is smaller than that of the original $Al_2O_3$ support of 306 $m^2$/g. If a comparison is made with the alumina support, the surface area of CoMo supported alumina is close to that of the original alumina support. The pore size of 74 Å is close to that the pore size of the alumina support 73 Å. However, the pore volume is decreased from 0.85 cc/g to 0.51 cc/g, which may be due to CoMo metal deposition and in-situ formed carbon incorporated in the catalyst.

Temperature Programmed Sulfidation

Temperature-programmed sulfidation (TPS) was carried out using a Rubotherm 1-Microgram Magnetically Decoupled Microbalance equipped with MS. About 0.5 g of $CoMo/Al_2O_3$ was used for each TPS analysis. After the catalyst was charged in the microbalance, the system was purged with 100 ml/min flow of helium for 30 min. Then helium was replaced with a mixture of 10% $H_2S/H_2$ gas. The system was purged with 10% $H_2S/H_2$ gas for 30 min at room temperature. The microbalance system was ramped from room temperature to 600° C. at 4° C./min, and held at 600° C. for an additional 4 hr.

Figure 2:
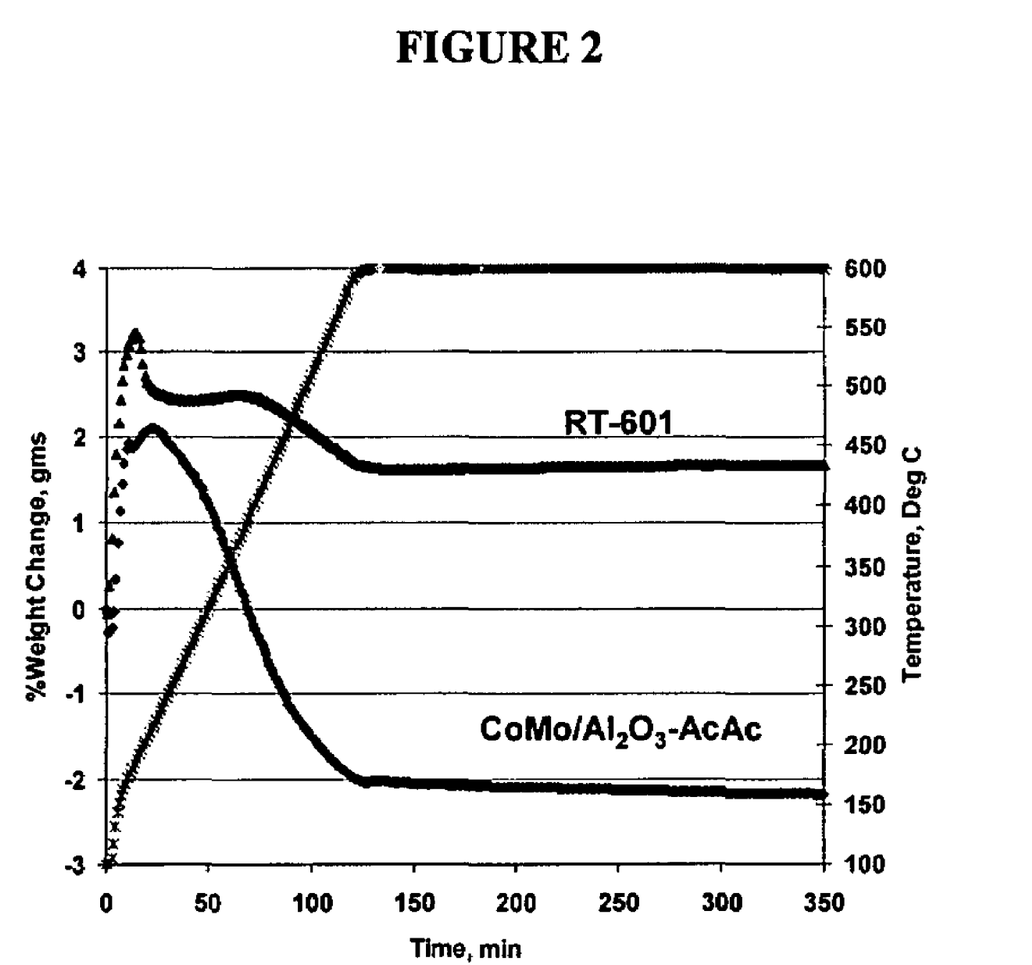
FIG. 2 is a graph showing results from temperature programmed sulfidation of CoMo/$Al_2O_3$ catalysts.

FIG. 2 shows TPS profiles for the inventive CoMo—AcAc catalyst and RT-601, a commercially available alumina supported CoMo catalyst made by Albemarle Catalyst Company. The TPS profiles reveal differences between the commercial CoMo catalyst B and the CoMo—AcAc catalyst, even though they are both alumina supported CoMo catalysts. Both catalysts showed some initial weight gain before the temperature reached 250° C., which may be due to catalyst sulfidation. The TPS profiles indicate that the CoMo—AcAc/$Al_2O_3$ catalyst experienced significantly more weight loss than the commercial catalyst, which may be due to additional decomposition of Co and Mo acetylacetonates, and/or removal of residual carbon by hydrogen striping during the temperature programmed sulfidation process.

X-Ray Powder Diffraction

XRD analysis of the samples was obtained using a Bruker D4 Endeavor, manufactured by Bruker AXS and equipped with a Vantec-1 high-speed detector. The 2 theta scan used a Cu target at 35 kV and 45 mA. The diffraction patterns were taken between 2° and 70° 2 theta. The step size was 0.01794 degrees and the time/step is 0.1 second.

Figure 3:
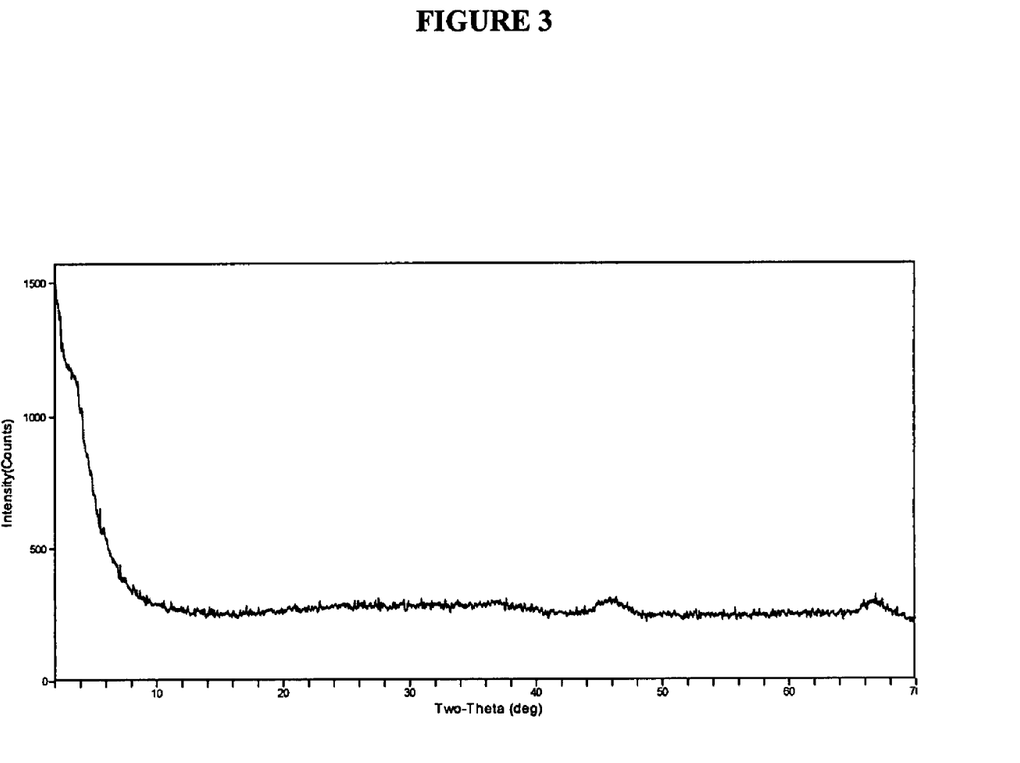
FIG. 3 is an XRD spectrum of a CoMo/$Al_2O_3$ catalyst.

FIG. 3 shows an X-ray diffraction pattern of CoMo—AcAc/$Al_2O_3$ after calcination in nitrogen. It can be seen that no crystallized CoMo oxides phase are formed on the resolution scale of the XRD pattern. The CoMo oxides phases in the catalyst are either amorphous, crystalline on a scale smaller than the resolution of the XRD, or otherwise highly dispersed on the surface of alumina. Note that the catalyst contains 6% CoO and 24% $MoO_3$. The surface area required for a monolayer dispersion of CoMo metal oxides at this loading is about 200 $m^2$/g. The surface area of the alumina support used for forming the CoMo—AcAc catalyst is 306 $m^2$/g. Because the surface area of the support is greater than the surface area needed to fully disperse the metals in a monolayer, it is not surprising that the XRD pattern for this catalyst appears to be amorphous.

Catalyst Diesel HDS Evaluation

Figure 4:
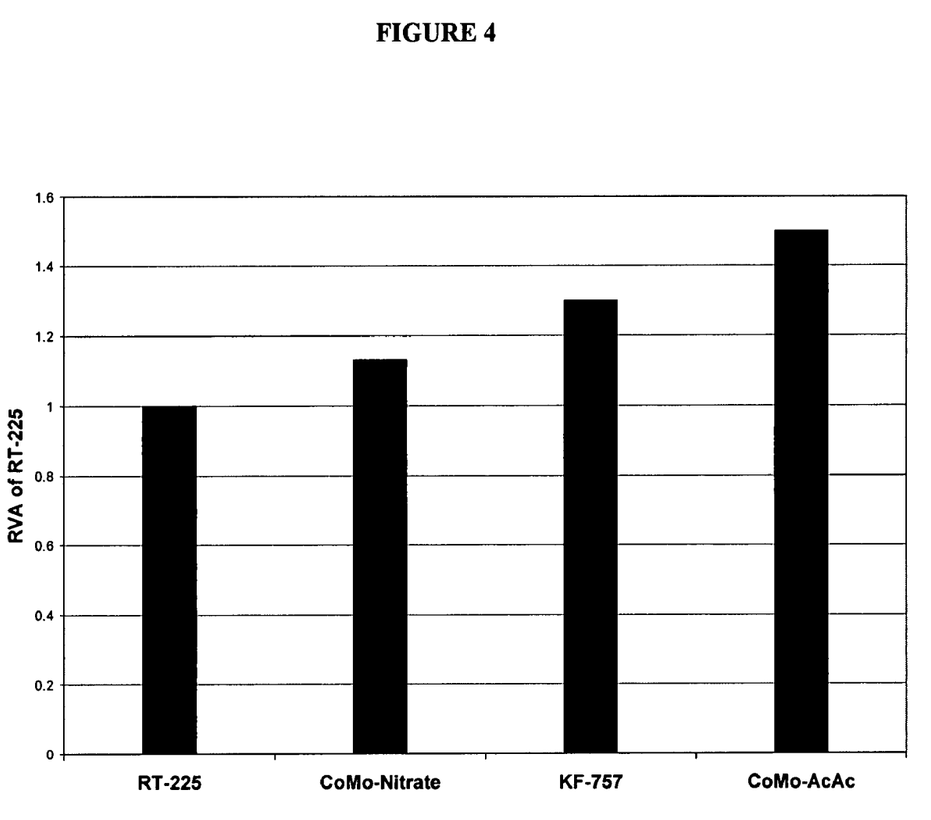
FIG. 4 depicts relative hydrodesulfurization activity for various CoMo catalysts.
Figure 5:
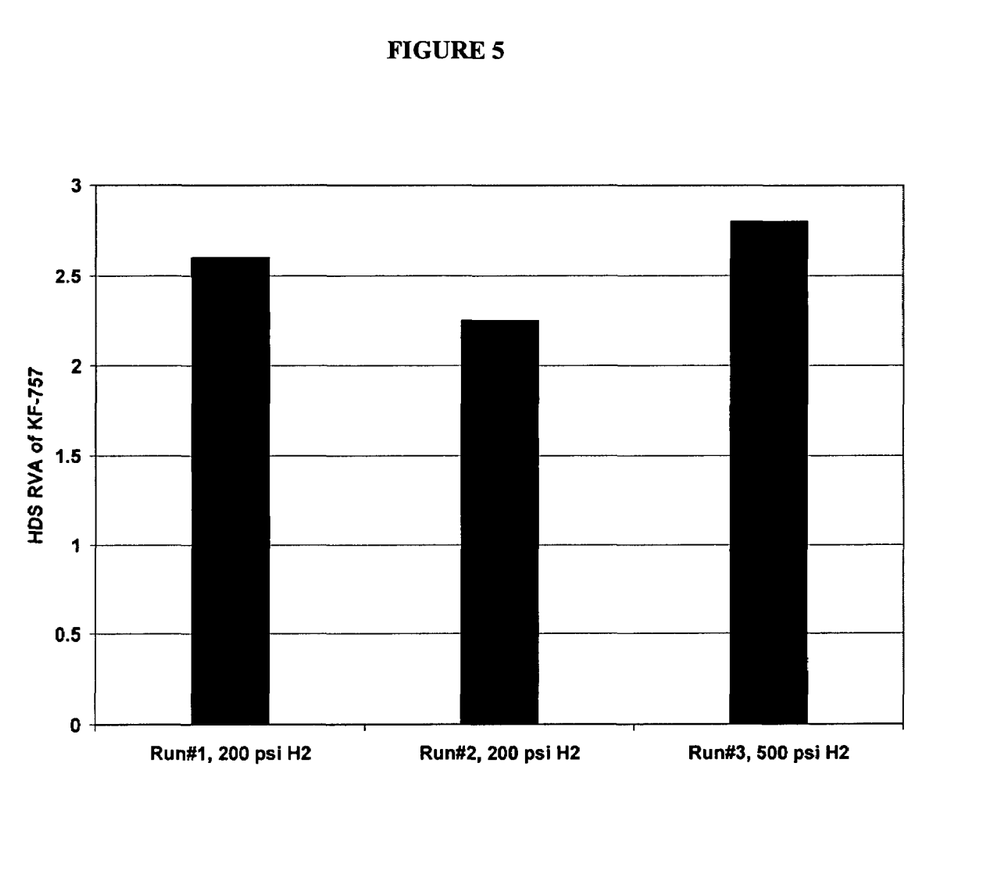
FIG. 5 depicts relative hydrodesulfurization activity for various CoMo catalysts.

FIGS. 4 and 5 show the HDS relative volumetric activities (RVA) of CoMo—AcAc/$Al_2O_3$ versus several catalysts. In FIG. 4, CoMo—AcAc is compared with the other CoMo catalyst prepared in this Example, as well as with RT-225 and KF-757. In this set of catalyst HDS activity evaluations, all of the catalysts were sulfided using 3% $H_2S$ balanced with $H_2$. Virgin distillate was used as a breaking in solvent. The feed used for the catalyst evaluation was deeply hydrotreated distillate that contained 334 ppm S and 40 ppm N. Most of the sulfur molecules in the feed were hard sulfur compounds such as DEDBT. The catalysts were exposed to the distillate feed at a temperature of 315° C. and a pressure of 200 psig. As shown in FIG. 4, the CoMo—AcAc catalyst provided at least a 15% activity advantage relative to the other catalysts tested. Note that the activity advantage of CoMo—AcAc relative to the other CoMo catalysts shown in Table 1 roughly correlates with the oxygen uptake values shown in Table 5.

FIG. 5 provides a further comparison with KF-757, which provided the closest activity comparison to CoMo—AcAc in the tests shown in FIG. 4. In FIG. 5, CoMo—AcAc and KF-757 were tested using another deeply hydrotreated distillate. This feed had a density of 0.878 g/cc at 22° C. and contained 550 ppm S and 395 ppm N. The tests were carried out at 200 and 500 psig respectively using batch reactors.

FIG. 5 shows the activity of the CoMo—AcAc catalyst relative to the activity of commercial catalyst B for each run. In FIG. 5, the HDS activity evaluations were carried out sequentially. The first test was performed at 200 psig hydrogen partial pressure. The HDS activity is about 2.6× as active as KF-757. The repeat run showed a somewhat lower activity of 2.25×. When the hydrogen partial pressure was increased from 200 to 500 psig, the relative HDS activity increased to 2.8×.

What is claimed is:

1. A process for making a supported hydroprocessing catalyst, comprising:
   a) preparing a solution, slurry, or other mixture containing at least one Group VIB metal, at least one Group VIII metal, and an organic solvent;
   b) impregnating a support with the solution, slurry, or mixture;

c) drying the impregnated support at a temperature of from 200 to 450° C. to produce a partially calcined, impregnated support having a total metals content of between about 20-60 wt %, calculated as metal oxides, and a carbon content of between about 5-20 wt % based on the weight of the partially calcined, impregnated support, the organic solvent not being present on the partially calcined, impregnated support; and d) sulfiding the partially calcined, impregnated support that includes at least a portion of the carbon content.

2. The process of claim 1, wherein at least one of the Group VIB metal and the Group VIII metal is provided as a metal salt, the anion of the metal salt being a conjugate base of the solvent.

3. The process of claim 1, wherein the solution, slurry, or mixture comprises at least one additional transition metal.

4. The process of claim 3, wherein the at least one additional transition metal is Co, Mo, Ni, W, or Zn.

5. The process of claim 1, wherein impregnating a support with the solution, slurry, or mixture comprises impregnating the support with a volume of solution per volume of support that is between about 0.9-1.05 times the pore volume of the support per volume of support.

6. A process for making a supported hydroprocessing catalyst, comprising:
 (a) preparing a solution, slurry, or other mixture containing at least one Group VIB metal and at least one Group VIII metal, and at least one organic complexing agent;
 (b) impregnating a support with the solution, slurry, or mixture;
 (c) drying the impregnated support at temperatures of from 200 to 450° C. to produce a dried, impregnated support;
 (d) subjecting the dried, impregnated support to at least one further cycle of steps (b) and (c) until an impregnated support having a total Group VIB and Group VIII metals content of between about 20-60 wt %, calculated as metal oxides, is produced;
 (e) partially calcining the impregnated support having a total Group VIB and Group VIII metals content of between about 20-60 wt % from step (d) at temperatures of from 200 to 450° C. for a time sufficient to yield a partially calcined impregnated support having a carbon content of between about 5-20 wt. %, based on the weight of the partially calcined, impregnated support, the organic complexing agent not being present on the partially calcined, impregnated support; and
 (f) sulfiding the calcined support from step (e) under sulfiding conditions to produce a supported catalyst that includes at least a portion of the carbon content.

7. The method of claim 6, wherein the dried, impregnated support to at least one further cycle of steps (b) and (c) until an impregnated support having a total Group VIB and Group VIII metals content of at least about 35 wt % is produced.

8. The method of claim 6, wherein the organic complexing agent is an organic acid that contains a —COOH functional group and at least one additional functional group selected from carboxylic acid —COOH, hydroxmate acid —NOH—C=O, hydroxo —OH, keto —C=O, amine —NH$_2$, amide: —CO—NH$_2$, imine: —CNOH, epoxy: =COC=, or thiol: —SH.

9. The method of claim 6, wherein the organic complexing agent is glyoxylic acid, pyruvic acid, or citric acid.

10. The method of claim 6, wherein the impregnated support is partially calcined at a temperature from about 200 to 450° C.

11. The method of claim 6, wherein the impregnated support is partially calcined at a temperature from about 300 to about 400° C.

12. A process for making a supported hydroprocessing catalyst, comprising:
 (a) preparing a solution, slurry, or other mixture containing at least one transition metal and at least one organic complexing agent;
 (b) impregnating a catalyst including a support and at least one Group VIB metal with the solution, slurry, or mixture;
 (c) drying the impregnated catalyst at temperatures of from 100 to 450° C. to produce a dried, impregnated catalyst having a total metals content of between about 20-60 wt %, calculated as metal oxides, and a carbon content of between about 5-20 wt %, based on the weight of the dried, impregnated support; and
 (d) sulfiding the dried, impregnated catalyst from step (c) under sulfiding conditions to produce a sulfided catalyst.

13. The process of claim 12, wherein the transition metal is a first row transition metal.

14. The process of claim 12, wherein the transition metal is Co, Ni, or Zn.

15. The process of claim 12, wherein the Group VIB metal is molybdenum or tungsten.

16. The process of claim 12, wherein the support further contains at least one Group VIII metal.

17. The process of claim 12, wherein the solution, slurry or mixture further comprises at least one Group VIII metal.

18. A supported hydroprocessing catalyst, comprising:
 a support;
 a Group VIB metal;
 a Group VIII metal, so as to achieve a total metals content of between about 20-60 wt %, calculated as metal oxides; and
 between about 5-20 wt %, based on the combined weight of the support and the metals, of an organic residue formed by heating an organic complexing agent on the support to a temperature of from about 200° C. to about 450° C. for a time sufficient so that the organic complexing agent is not present on the support,
 wherein at least a portion of the organic residue remains on the catalyst after sulfidation of the catalyst.

19. The catalyst of claim 18, wherein the organic residue is formed by heating the organic complexing agent in the presence of an inert atmosphere.

20. The catalyst of claim 18, wherein the catalyst further comprises at least one additional transition metal.

21. The catalyst of claim 18, wherein the support has a pore volume of at least 0.35 cc/cc of support.

22. The catalyst of claim 18, wherein the catalyst is sulfided.

23. A sulfided, supported hydroprocessing catalyst, consisting essentially of:
 a support;
 one or more Group VIB metal oxides or sulfides;
 one or more Group VIII metal oxides or sulfides, so as to achieve a total metals content of between about 20-60 wt %, calculated as metal oxides; and
 at least 5 between about 5-20 wt %, based on the combined weight of the support and the metals, of an organic residue formed by heating an organic complexing agent on the support to a temperature of from about 200° C. to about 450° C. for a time sufficient so that the organic complexing agent is not present on the support.

* * * * *